(12) United States Patent
Beier et al.

(10) Patent No.: US 6,367,987 B1
(45) Date of Patent: Apr. 9, 2002

(54) CONNECTOR HOLDER

(75) Inventors: Axel Beier; Hendryk Hoffmeister, both of Berlin; Hans-Dieter Weigel, Caputh, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/495,964

(22) Filed: Feb. 2, 2000

(30) Foreign Application Priority Data

Feb. 2, 1999 (DE) .......................................... 199 05 244

(51) Int. Cl.⁷ ................................................. G02B 6/36
(52) U.S. Cl. ............................................ 385/76; 385/53
(58) Field of Search ............................... 385/76.78, 56, 385/60, 59, 58, 53

(56) References Cited

U.S. PATENT DOCUMENTS

| | | | |
|---|---|---|---|
| 4,872,736 A | 10/1989 | Myers et al. | 350/96.2 |
| 5,574,812 A * | 11/1996 | Beier et al. | 385/78 |
| 5,579,425 A * | 11/1996 | Lampert et al. | 385/59 |
| 6,076,974 A * | 6/2000 | Carlisle et al. | 385/76 |
| 6,206,580 B1 * | 3/2001 | Nagaoka et al. | 385/78 |

FOREIGN PATENT DOCUMENTS

| | | |
|---|---|---|
| DE | 93 14 172 U1 | 2/1994 |
| DE | 4302826 C1 | 3/1994 |
| DE | 4303737 A1 | 8/1994 |
| DE | 93 20 829 U1 | 4/1995 |
| EP | 0 729 048 A1 | 8/1996 |

OTHER PUBLICATIONS

"Design and performance advance in MT connectors", Lightwave, Nov. 1997, pp. 61–67.

* cited by examiner

*Primary Examiner*—Phan T. H. Palmer
(74) *Attorney, Agent, or Firm*—Herbert L. Lerner; Laurence A. Greenberg; Werner H. Stemer

(57) ABSTRACT

The holder receives at least one plug connector housing formed with individual housing rest arms. The rest arms are formed with locking elements. The holder has action areas acting on the rest arms. If a suitable force is exerted on rear activation areas of the holder, the action areas act on the rest arms and move the locking elements into an unlocked position.

4 Claims, 2 Drawing Sheets

CONNECTOR HOLDER

BACKGROUND OF THE INVENTION

Field of the Invention

The invention lies in the fiber-optics field and, more specifically, in the field of multichannel optical coupling technology for the optical coupling of several optical conductor ends to corresponding assigned coupling partners. The coupling partners can, for example, be optical transmitters and/or receivers or be formed from the same or similar plug connectors.

The invention relates in particular to a holder for at least one plug connector casing with individual casing rest arms to which locking elements are assigned.

Numerous plug connector concepts are known in the optical coupling field. U.S. Pat. No. 5,574,819 (German published patent application DE 43 03 737 A1) presents a so-called duplex plug connector with two individual plug pins, in each of whose central longitudinal boreholes an optical conductor end runs up to a pin front surface. Such plug connectors usually serve for the simultaneous connection of an optical conductor end to a receiver and a second optical conductor end to a transmitter. The housing of this plug connector presents rest arms with detents which, in inserted state rest in recesses or openings of a coupling or plug inlet, and accordingly on the one hand mechanically lock the plug connector in position and on the other hand, if required, form an outer support for spring forces, with which the plug pins are prestressed in coupled state to their assigned coupling partners.

In order to satisfy the demand for increasing data transmission capacity and the simultaneous demand for increasingly compact and miniaturized couplings, there has been an increasing development of plug connectors which seal a number of individual optical conductors ready for coupling in as small a space as possible in a common plug connector casing. So-called MT plug connectors have been disclosed in this context (*LIGHTWAVE*, November 1997, pages 61–67). It is basically conceivable to provide such MT plug connectors with a correspondingly miniaturized housing, as is shown for example in U.S. Pat. No. 5,574,819. To be sure, the problem arises with such a miniaturizing that it is only possible to provide relatively small and possibly difficultly accessible operation surfaces for assembly and locking or for disassembling and unlocking, and on the other hand the space among the plug connectors accessible for operations is dimensioned correspondingly narrowly in case of a dense arrangement of several plug connectors of this type.

A holder with at least two inputs for each individual optical plug connector housing is known from our earlier U.S. Pat. No. 5,574,812 (German patent DE 43 02 826 C1). The plug connector housings are deposited floating in the inputs in order to make a simple simultaneous insertion or pulling out of the plug pins arranged in the housings or from assigned plug pin installations possible. Only a single light wave end also thereby seals off a plug pin.

SUMMARY OF THE INVENTION

It is the object of the invention to provide a holder configuration for an optical connector or the like which overcomes the disadvantages and shortcomings of the above-described prior art disclosures and which holds at least one plug connection housing with individual housing rest arms which makes possible a simple indirect operation of the rest arms from a rear area, viewed in plug direction.

With the foregoing objects in view there is provided, in accordance with the invention, a holder for at least one plug connector housing with individual housing rest arms carrying locking elements, comprising:

a holder body formed with action areas adapted to act on rest arms of a plug connector housing and at least one rear activation area viewed in plug direction; and said activation areas, upon an activation thereof, acting on the rest arms and move locking elements formed on the rest arms into an unlocked position.

In other words, the objects of the invention are satisfied with the that is formed with action surfaces acting on the rest arms and at least one rear operation surface (the term "rear" is true with reference to the plug direction), and on activation of the activation surface the action surfaces act on the rest arms and move the locking elements into an unlocked position.

A first essential advantage of the holder according to the invention consists in the fact that it is possible to activate the rest arms or their locking elements indirectly by means of the holder. In addition to its holding function, the holder is thereby suitable for the additional function of bringing about an unlocking of the locking elements from an area at the rear. This is especially advantageous if the actual coupling area and thereby the plug connector housing are only difficultly accessible, especially in the case of a multichannel optical plug connection.

Another substantial advantage consists in the fact that the activation areas can be optimized independently of requirements concerning the plug connector housing, for example in connection with ergonomic aspects. With it, for example, a plug connector housing difficult to handle and unlock can be handled better by means of the holder according to the invention.

In accordance with an added feature of the invention:

the holder is movable axially backward relative to the rest arms in the plug direction; and said action areas or action surfaces of the rest arms cooperating therewith are formed as inclined planes.

In this development of the invention, preferred in connection with the radial space for plug alignment necessary for activation of the holder, the holder can be pushed back axially in plug direction in relation to the rest arms, and the action areas or the active surfaces of the rest arms cooperating with it are designed as inclined planes.

In accordance with an additional feature of the invention:

said holder body is formed with openings for receiving a plurality of plug connector housings each formed with individual housing rest arms; and said action areas (upon their activation) simultaneously act on the locking elements of several of the plurality of plug connector housings.

This development of the holder especially responds to increasing requirements for the simultaneous mounting of several plug connector housings with in each case, for example, one MT plug. It is thereby possible in each case, for example, for two such plug connectors to be handled each time, one for a multichannel optical transmitter and one for a multichannel optical receiver. Such a combination of transmitter and receiver units in a common carrier system is frequently encountered in practice.

In accordance with a concomitant feature of the invention, there are provided snap elements along which plug connector housings are insertible transversely to the plug direction and wherein the plug connector housings are formed with associated recesses, whereby the snap elements mesh with the recesses to hold the plug connector housing.

This variation is especially preferred in technical production in which the holder is formed with snap elements by means of which the plug connector housing or housings is or are movable vertically into the assigned input and hold the given plug connector housing.

Other features which are considered as characteristic for the invention are set forth in the appended claims.

Although the invention is illustrated and described herein as embodied in a holder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
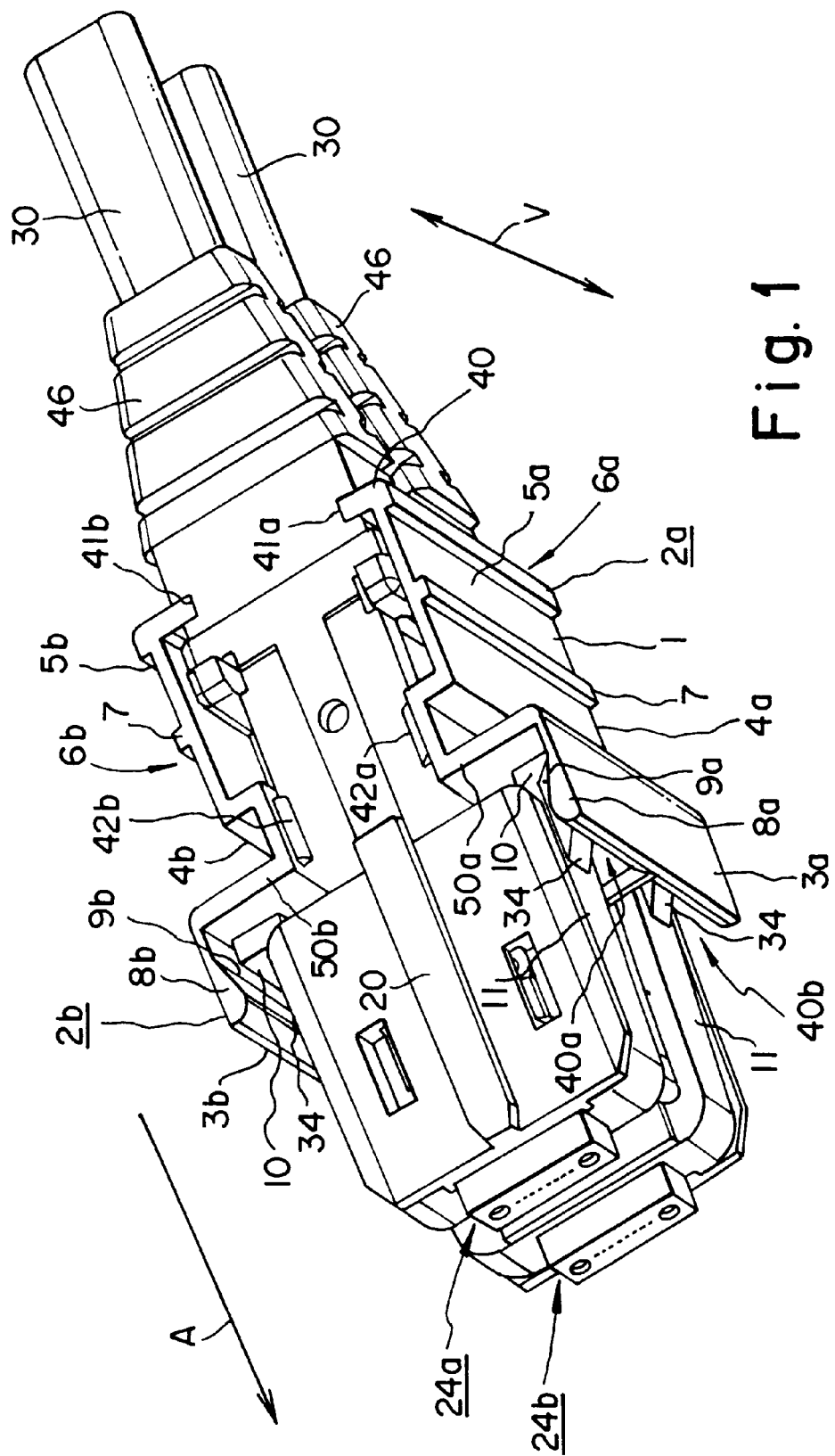
FIG. 1 is a perspective view of a holder in accordance with the invention.

Referring now to the figures of the drawing in detail and first, particularly, to FIG. 1 thereof, there is shown a holder 1 in a considerably enlarged view. The holder has two parallel vertically oriented walls 2a, 2b.

The walls in each case include an anterior widened area 3a, 3b viewed in plug direction A, an attached narrowed neck area 4a, 4b, and an area 5a, 5b at the rear. Rear areas 5a, 5b are designed as grip zones or activation area 6a, 6b with vertical arms 7. Thickenings 8a, 8b facing each other in anterior area 3a, 3b are provided in all cases with starting slope 9a, 9b. The starting slopes function as action surfaces 9a, 9b and cooperate as inclined planes with ends 10 of rest arms 11.

Figure 2:
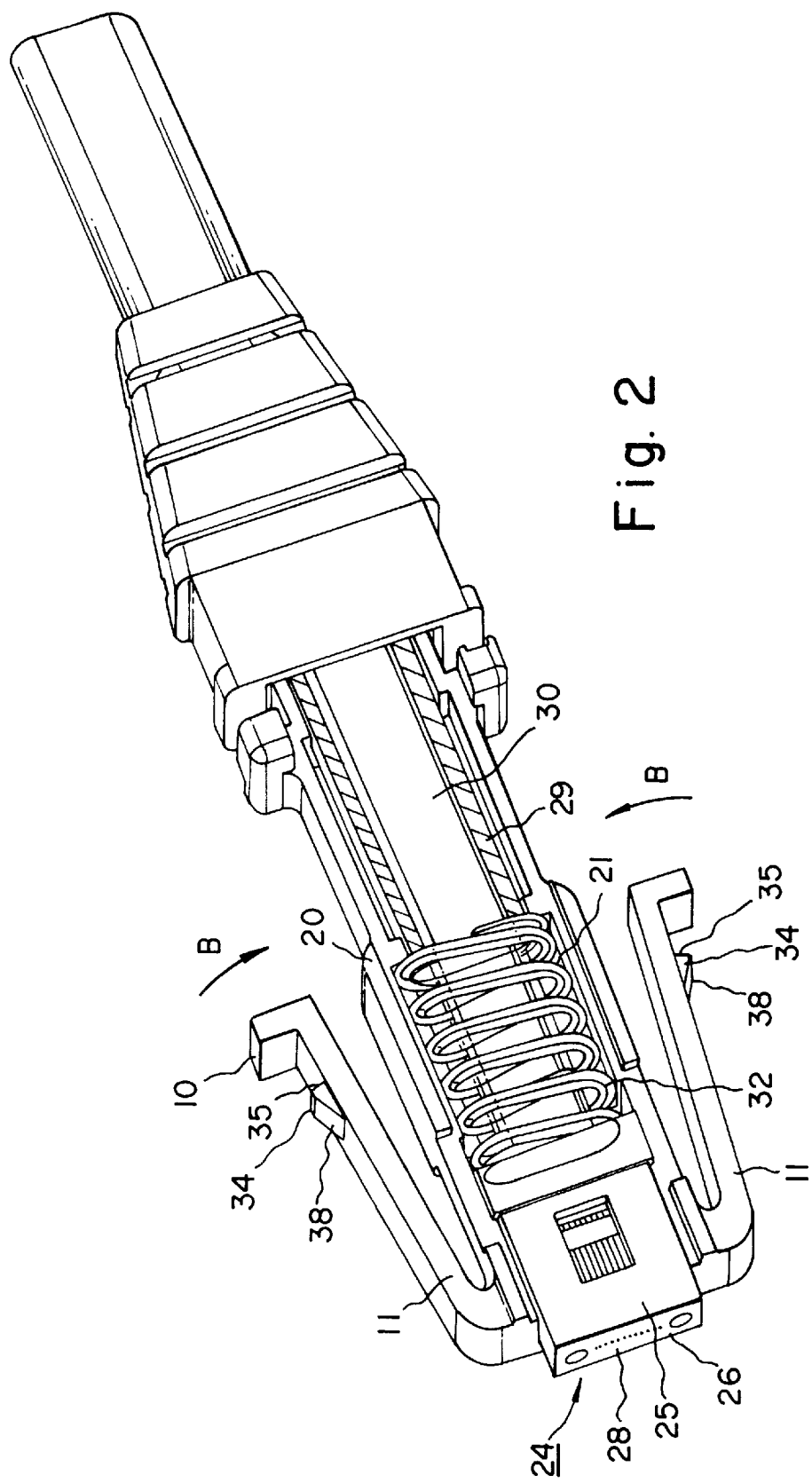
FIG. 2 is a perspective view of the essential elements of a plug connector housing cooperating with the holder.

With reference to the more detailed illustration of FIG. 2, the rest arms 11 are integrally formed with plastic housing 20, which in the central area presents input chamber 21 for components of plug connector 24. In addition to the plug connector housing 20, the plug connector includes a plug 25 as an essential component, among others, which can be designed as a conventional MT plug. A number of optical conductors 28 end at its front side 26, which enter from the rear end of the plug connector as a ribbon cable 30, e.g. through casing 29. Optical conductor ends 28 pass through an oval helical spring 32, which mechanically prestresses the plug 25 and therewith the front surfaces of the optical conductor ends 28 against a non-illustrated coupling partner.

The rest arms 11 have elevations 34 oriented outwards in the form of detents which in a known way rest in locked state with their stop face 35 against a non-illustrated stop. The plug connector is thereby mechanically locked in position. In addition, an outer support is provided for the coupled state to conteract pressure forces of plug 25 produced by compression of the spring 32. In locking, the locking partner runs over inclined starting slopes 38 by way of a rest hook 34 and thereby compresses the rest arms 11 in the direction of an arrow B. After the end of slope 38 has been reached, the locking elements 34 lock—by spring-ack of rest arms 11—in an assigned arm opening of the locking partner.

Referring back to FIG. 1, two plug connector housings 24a, 24b (FIG. 2) of this kind are, for example, inserted in vertical direction V from the upper side of the holder turned to the observer or from the turned away lower side of the holder into input 40a, 40b assigned to each. The walls 2a, 2b are elastically moved apart in the insertion process by diverting entry slope 41a, 42a or 41b, 42b to the edge of the respective plug connector housing. When the plug connector (e.g., 24a) has reached its assigned input 40a, 40b, elements 41a to 42b snap behind the housing contour and thereby lock the housing, capable of axial movement, in the holder.

Essentially different release mechanisms for movement of action areas are conceivable for activating the rest arms 11. By a suitable rocking construction, for example, radial pressure could be transformed backward to activation area 6a, 6b to a rocking movement of action surfaces 9a, 9b and thereby to an activation of the rest arms.

An axial movability of holder 10 against plug connector housings 24a, 24b opposite plug direction A according to the construction represented in FIG. 1 is especially preferred. Snap elements 41a to 42b thereby slide on the respective surface of the plug connector housing or on anti-kink or anti-buckling protectors 46, which surround outgoing band cable 30 (FIG. 2). When the holder is pulled back, inclined planes (action surfaces) 9a, 9b come in body contact with the action areas 10 of rest arms 11 and thereby move the rest arms on each other until they are loosened from their locked positions. A simultaneous unlocking of both (or still more) plug connector housings 24a, 24b thereby advantageously takes place. In assembling, the holder can conveniently be gripped in rear activation area 6a, 6b and, together with the plug connector housings, can be inserted in the plug direction A into the appropriate coupling partner. Snap elements 41a, 41b thereby enter into body contact with the rear end of the respective housing 24a, 24b.

We claim:

1. A holder for at least one plug connector housing with individual housing rest arms carrying locking elements, comprising:

a holder body formed with action areas adapted to act on the rest arms of the plug connector housing and at least one rear activation area viewed in plug direction; and said activation areas, upon an activation thereof, acting on the rest arms and move locking elements formed on the rest arms into an unlocked position.

2. The holder according to claim 1, wherein:

the holder is movable axially backward relative to the rest arms in the plug direction; and said action areas or action surfaces of the rest arms cooperating therewith are formed as inclined planes.

3. The holder according to claim 1, wherein:

said holder body is formed with openings for receiving a plurality of plug connector housings each formed with individual housing rest arms; and said action areas simultaneously act on the locking elements of several of the plurality of plug connector housings.

4. The holder according to claim 1, which comprises snap elements along which plug connector housings are insertible transversely to the plug direction and wherein the plug connector housings are formed with associated recesses, whereby the snap elements mesh with the recesses to hold the plug connector housing.

* * * * *